W. TURNBULL.
MULTIPLE DISK CLUTCH.
APPLICATION FILED SEPT. 1, 1917.

1,344,361.

Patented June 22, 1920.

WITNESSES:
Charles Pickles
J. C. Benesch.

INVENTOR
William Turnbull
BY Strong & Townsend
ATTORNEYS

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

MULTIPLE-DISK CLUTCH.

1,344,361.

Specification of Letters Patent.

Patented June 22, 1920.

Application filed September 1, 1917. Serial No. 189,402.

*To all whom it may concern:*

Be it known that I, WILLIAM TURNBULL, a citizen of the United States, residing at Peoria, in the county of Peoria and State of Illinois, have invented new and useful Improvements in Multiple-Disk Clutches, of which the following is a specification.

This invention relates to multiple disk clutches; and has for its object to simplify and improve the construction and operation of a device of the character shown and described in my co-pending application Serial Number 141,772, filed January 11th, 1917.

In the prior device, when it is desired to re-position the collar which carries the clamping levers, whereby to compensate for wearing of the disks or to vary the pressure of the clamping levers against the pressure plate, three separate adjustments are necessary one for each of the stud bolts upon which the said collar is carried. Aside from the time thus consumed, it is a matter of difficulty to equalize the action of all three clamping members on the pressure plate.

In the present invention I so arrange and construct the parts that a single member only need be adjusted to re-position said collar, and thereby considerable time is saved in making the adjustment and the action of all three levers upon the pressure plate is equalized.

One form which my invention may assume is exemplified in the following description and illustrated in the accompanying drawings, in which—

Figure 1:
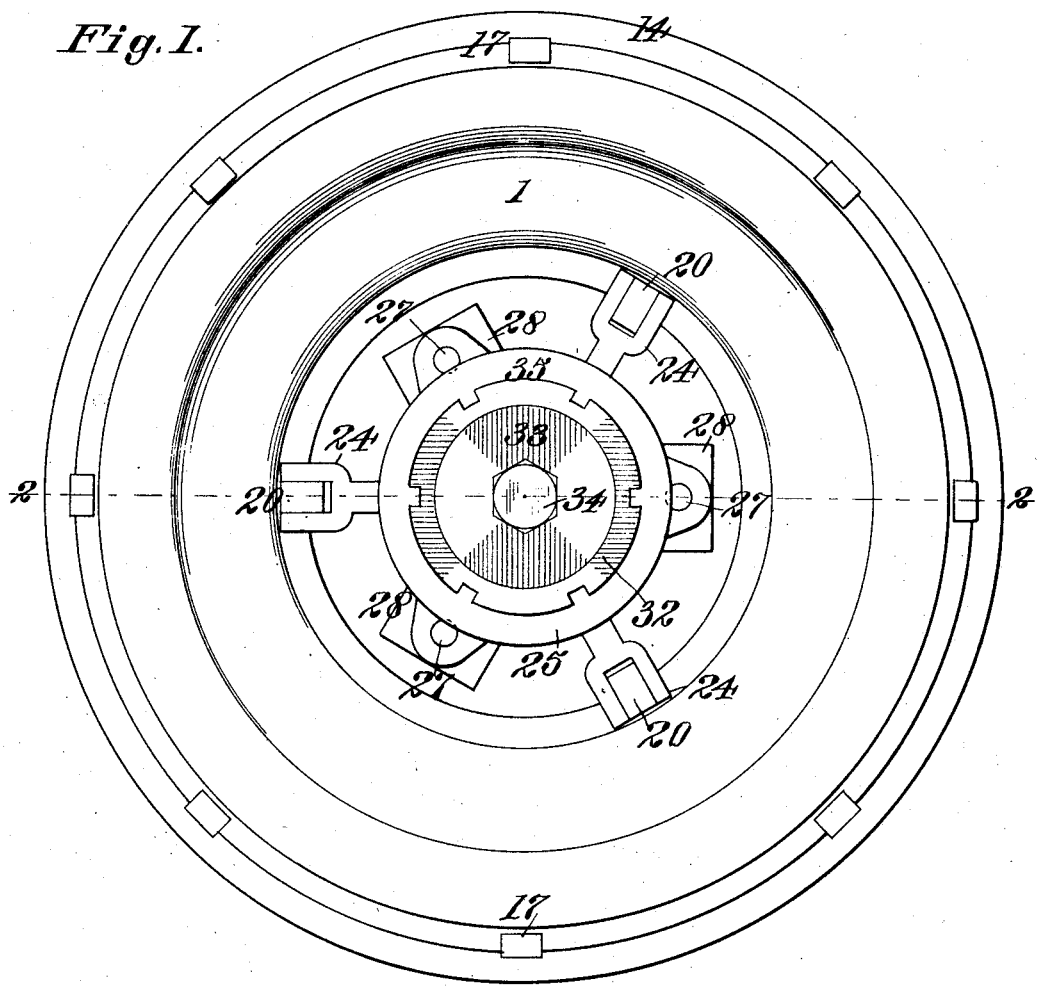
Figure 1 shows a side elevation of a clutch embodying my invention.

The clutch assembly in its present form includes a driving shaft 10, on which is fixed a driving clutch member 11 carrying a set of spaced driving disks 12, secured thereto by keys 13, said disks being preferably of the dry type faced with leather, fiber or similar friction material. A driven member 14, in the form of a drum, is mounted upon a sleeve 15 carried loosely on the shaft 10 and has disks 16 secured thereto by keys 17, said disks 16 being fitted between the disks 12.

An annular pressure plate 18 engages the disks at the front of the drum and is held in place and actuated by means of clamping levers 20 fulcrumed upon brackets 21, the latter formed upon a collar 22 slidable upon the hub 11ª of the driving member. There are three such clamping members in the present instance, spaced equidistantly around the pressure plate. A lug 23 on each clamping member, near the fulcrum thereof, is adapted to engage the annulus of the pressure plate when the lever is moved radially outward, whereby to force said plate against the disks.

For actuating said clamping levers, I connect each with a link 24, which in turn is pivotally connected to a clutch-actuating collar 25, slidable back and forth on the hub 11ª. Fixed upon the clutch-actuating collar is a series of stud bolts 27 projecting inwardly through an aperture in the end of a yoke 28, which yoke is fixed upon the collar 22. A spring 29 acts between the head 30 of the bolt and the end of the yoke to thrust the bolt inwardly and carry with it the clutch-actuating collar.

Figure 2:
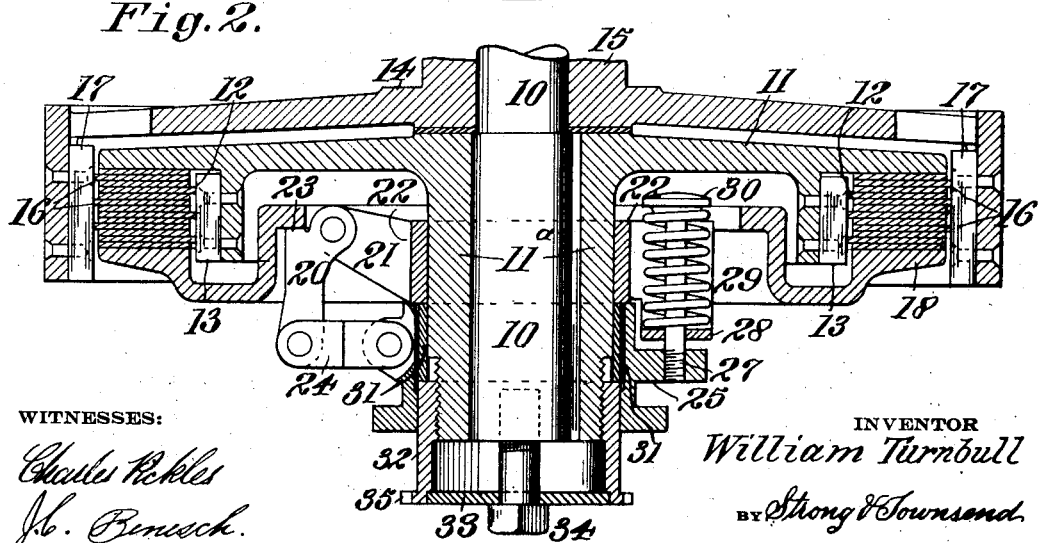
Fig. 2 shows a sectional view of the same, taken on the line 2—2 of Fig. 1.

As shown in Fig. 2, the collar 22, which supports the clamping levers, is retained in place by means of a spacing sleeve 31 which fits between the clutch-actuating collar 25 and the hub 11ª and abuts at its outer end against the nut 32 screwed onto the outer end of said hub. A locking plate 33, fitting into a shouldered recess on the outer end of the nut and held thereagainst by a bolt 34 entering the end of the shaft 10, locks said nut in adjusted position. A notched flange 35 on the nut is provided to receive a wrench to turn the same on the hub when it is desired to vary the position of the collar 22.

When the clutch actuating collar is at its inward limit of movement the links 24 will be at right angles to the axis of the driving shaft, in which position the clamping levers 20 will be moved outwardly into a position parallel with the axis of said shaft and in so moving the lugs 23 will have forced the pressure plate inwardly a sufficient distance to put the driving and driven disks into operative relation. It will be seen that when the clutch is set, the links 24 and clamping levers 20 form a toggle joint for positively retaining the pressure plate in operative position and, therefore, the constant strains usually imposed upon the springs are entirely removed at this time.

To release the clutch, the operator pulls the clutch releasing device outwardly, allowing the links 24 and levers 20 to tend toward a straight line, in doing which the outer ends of the clamping levers 20 will be moved inwardly, thus permitting the pressure plate to release the friction disks. The springs 29 need be of only sufficient force to actuate the clamping levers, through the medium of the shiftable clutch actuating device and the links 24, which, in view of the connections described, require but very little power as compared with the power required to actuate the pressure plate.

The sleeve 31 is loose on the hub of the driving member 11 and bears against the collar 22, and, being held by the nut 32, retains said collar in proper position for the clamping levers to act upon the pressure plate 18. When it is desired to vary the effective position of the clamping members to compensate for wear on the friction plates or to increase or diminish the force of the said levers upon the pressure plate the collar 22 is re-positioned accordingly by manipulation of the nut 32. The fact that a unitary adjusting means is made use of to vary the position of the said collar 22 simplifies the work at hand and insures that the action of the three clamping members will be equal.

Various changes in the construction and arrangement of the several parts herein shown and described may be employed without departing from the spirit of my invention as disclosed in the appended claims.

Having thus described my invention, what I claim and desire to secure by Letters Patent is—

1. A multiple disk clutch including driving and driven members with interposed friction disks, a pressure plate for the disks, a collar carried slidably on the hub of the driving member, a plurality of clamping devices carried by the collar and acting upon the pressure plate at points equidistantly spaced, means for actuating said clamping devices to control the pressure plate, and means for adjusting the position of said collar to vary the effectiveness of the clamping devices upon the pressure plate, said means comprising a spacing sleeve on the hub abutting the collar, and an adjusting nut on the outer end of the hub to move said sleeve, said collar being slidable over the sleeve and nut.

2. A multiple disk clutch including driving and driven members with interposed friction disks, a pressure plate for the disks, a collar carried slidably on the hub of the driving member, a plurality of clamping devices carried by the collar and acting upon the pressure plate at points equidistantly spaced, means for actuating said clamping devices to control the pressure plate, means for adjusting the position of said collar to vary the effectiveness of the clamping devices upon the pressure plate, said means comprising a spacing sleeve on the hub abutting the collar, an adjusting nut on the outer end of the hub to move said sleeve, and a locking device for the adjusting nut, said collar being slidable over the sleeve and nut.

3. A multiple disk clutch including driving and driven members with interposed friction disks, a pressure plate for the disks, a collar carried slidably on the hub of the driving member, a plurality of clamping devices carried by the collar and acting upon the pressure plate at points equidistantly spaced, means for actuating said clamping devices to control the pressure plate, means for adjusting the position of said collar to vary the effectiveness of the clamping devices upon the pressure plate, said means comprising a spacing sleeve on the hub abutting the collar, an adjusting nut on the outer end of the hub to move said sleeve, said actuating device for the clamping levers including a collar fitting slidably over the spacing sleeve and adjusting nut, springs carried by the first mentioned collar and tending normally to move the actuating collar inwardly, and connections between said actuating collar and the clamping levers.

In testimony whereof I have hereunto set my hand in the presence of two subscribing witnesses.

WILLIAM TURNBULL.

Witnesses:
  EMIL F. NORELIUS,
  H. S. BOSWELL.